A. Exton,
Bread Machine,
No. 52,278. Patented Jan. 30, 1866.
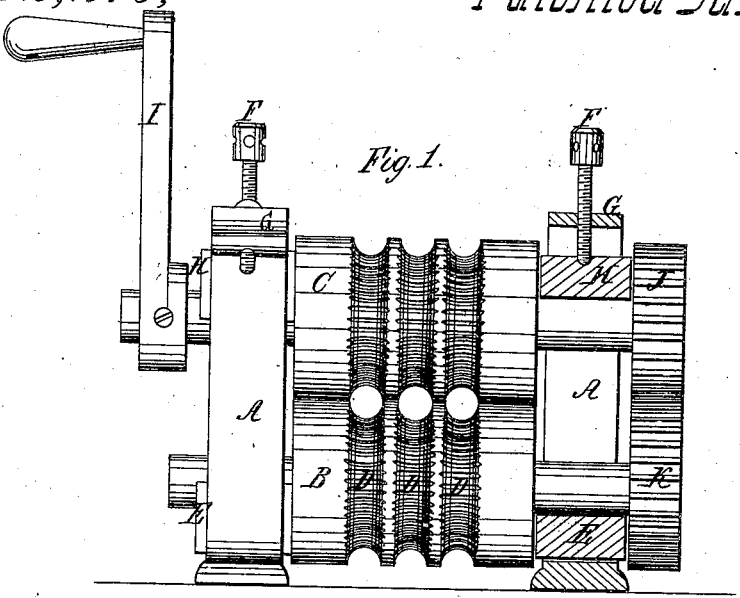
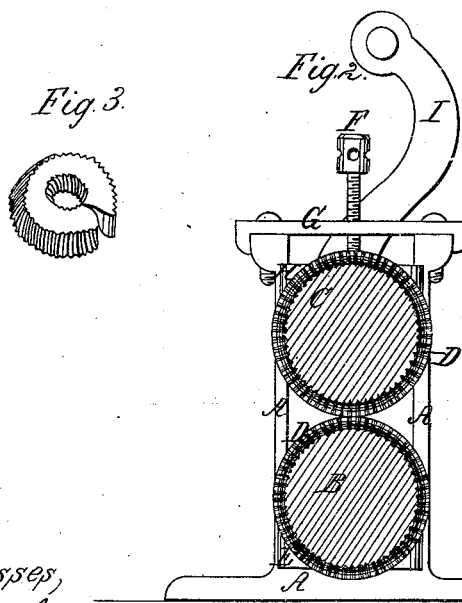
Witnesses,
Inventor;

UNITED STATES PATENT OFFICE.

ADAM EXTON, OF TRENTON, NEW JERSEY.

SCROLL-BISCUIT MACHINE.

Specification forming part of Letters Patent No. 52,278, dated January 30, 1866.

*To all whom it may concern:*

Be it known that I, ADAM EXTON, of Trenton, in the county of Mercer and State of New Jersey, have invented a new and useful Improvement in Scroll-Biscuit Machines; and I do hereby declare that the following is a full, clear, and exact description thereof, which will enable others skilled in the art to make and use the same, reference being had to the accompanying drawings, forming part of this specification, in which—

Figure 1 is a side view of the machine, partly in section. Fig. 2 is a vertical cross-section of the machine. Fig. 3 is a perspective view of a scroll biscuit or cracker baked from a strip of dough creased by my improved machine.

Similar letters of reference indicate like parts.

The object of my invention is to furnish a machine by which strips of dough may be creased or figured for making scroll-biscuit; and it consists in channeling or creasing the grooves of rollers through which are passed the strips of dough from which the biscuit are made.

A is the frame of the machine in which the rollers are hung and operated. B and C are the rollers, which are grooved with three or more semicircular grooves, D, in the manner represented in the drawings. These grooves D are then channeled or creased so as to imprint creases or figures upon the strips of dough that may be passed between the rollers through the said grooves. In the drawings these channels or creases are represented as being formed directly across the grooves D, but they may cross said grooves obliquely, or they may run in the same direction as the said grooves, or they may be replaced by figures or other designs to be printed upon the strips of dough that pass through the grooves.

The roller B revolves in bearings E in the bottom of vertical slots formed in the end pieces of the frame A. The roller C revolves upon the roller B, against which it is held down by the screws F passing through the caps G and pressing upon pieces H, which ride upon the axles of the roller C, holding said roller in contact with the lower roller, B. Motion is communicated to the roller C by the crank I, attached to the projecting end of the axle of said roller, as represented; and motion is communicated to the roller B by means of the gear-wheels J and K, as shown in Fig. 1.

I claim as new and desire to secure by Letters Patent—

The scroll-biscuit machine constructed with creased rolls and adapted to operate as and for the purpose herein described.

ADAM EXTON.

Witnesses:
M. M. LIVINGSTON,
JAMES T. GRAHAM.